(12) United States Patent
Chang et al.

(10) Patent No.: US 10,009,753 B2
(45) Date of Patent: Jun. 26, 2018

(54) CONTENT SUPPORTED WIRELESS COMMUNICATION SERVICE

(71) Applicants: Cellco Partnership, Basking Ridge, NJ (US); Verizon Patent and Licensing Inc., Basking Ridge, NJ (US)

(72) Inventors: Patricia R. Chang, San Ramon, CA (US); Donna L. Polehn, Kirkland, WA (US); Lalit R. Kotecha, San Ramon, CA (US); Deepak Kakadia, Antioch, CA (US); John F. Macias, Antelope, CA (US); Priscilla Lau, Fremont, CA (US); Yee Sin Chan, San Jose, CA (US); David Chiang, Fremont, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 338 days.

(21) Appl. No.: 14/136,595

(22) Filed: Dec. 20, 2013

(65) Prior Publication Data

US 2015/0181409 A1 Jun. 25, 2015

(51) Int. Cl.
*H04M 3/42* (2006.01)
*H04M 15/00* (2006.01)
*H04W 8/18* (2009.01)
*H04W 48/02* (2009.01)
*H04W 4/24* (2018.01)

(52) U.S. Cl.
CPC .............. *H04W 8/18* (2013.01); *H04M 15/68* (2013.01); *H04M 15/8083* (2013.01); *H04W 4/24* (2013.01); *H04W 48/02* (2013.01)

(58) Field of Classification Search
CPC .......... H04M 3/42; H04M 2215/0192; H04M 15/8094
See application file for complete search history.

(56) References Cited

U.S. PATENT DOCUMENTS

| | | | | |
|---|---|---|---|---|
| 2008/0288658 | A1* | 11/2008 | Banga | G06F 17/30867 709/245 |
| 2010/0106572 | A1* | 4/2010 | van Hoff | G06Q 30/02 705/14.4 |
| 2011/0145149 | A1* | 6/2011 | Valdes | G06Q 20/10 705/44 |
| 2012/0259786 | A1* | 10/2012 | Cowan, II | H04N 21/2542 705/310 |
| 2013/0304616 | A1* | 11/2013 | Raleigh | G06Q 20/145 705/34 |
| 2014/0040975 | A1* | 2/2014 | Raleigh | H04W 12/12 726/1 |

(Continued)

*Primary Examiner* — Asghar Bilgrami (57) ABSTRACT

Methods and systems are configured for accessing content supported wireless communications services. A method for obtaining non-subscription access to a network may include sending a request to access a network, and determining if subscription access to the network was granted. When subscription access is not granted, the method may further include receiving terms for non-subscription access to the network upon determining subscription access was not granted, determining if the received terms for non-subscription access were accepted, and then receiving advertising content and non-subscription access to the network in response to determining the terms for non-subscription access were accepted.

21 Claims, 9 Drawing Sheets

(56) References Cited

U.S. PATENT DOCUMENTS

2014/0057566 A1* 2/2014 Watfa ............... H04W 48/16
                                                455/41.2
2015/0289167 A1* 10/2015 Alex ............... H04W 28/24
                                                370/329

* cited by examiner

CONTENT SUPPORTED WIRELESS COMMUNICATION SERVICE

BACKGROUND

Conventional access to wireless communication networks and services requires some form of payment by the user of a mobile device. Some forms of access require a plan which may involve a fixed-term contractual arrangement with a wireless services provider, which include periodic payments to be made by the user over the life of the contract. These contracts may include subsidized rates for a wide range of mobile devices as an incentive for users to enter such contracts. Alternatively, other forms of payment may not require a contract, but involve a single payment for a fixed amount of access to a wireless network. Similar arrangements may includes so-called "pre-paid phones" which involve an initial purchase from a limited selection of mobile devices, and additional payments for as long as the users wishes to maintain access. Conventional forms of network access may lack flexibility and convenience for the user, especially if the user's access needs vary greatly over time. Moreover, conventional access may become expensive long term, and/or provide excess capacity that the user cannot utilize fully.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to approaches for providing wireless access and services that are supported by advertising content. These embodiments present a new advertising-based access model wherein a user is permitted access to a wireless network without having to resort to conventional access methods. The conventional access methods, which are referred to herein "subscription access," usually require the user to pay for access to the network. Subscription access to the network can be established, for example, by entering into contractual plans with carriers, purchasing pre-paid phones from merchants, or purchasing access by making payments in a "pay as you go" manner. An advertising-based access model, which is referred to herein as "non-subscription" access to the network, permits sponsors to pay for a user's access to a wireless network instead of the user. Thus, non-subscription access grants the user free (or reduced cost) network access, and in return the user agrees to accept advertising and/or to an advertiser's terms prior to gaining access. Such terms may include permitting the sponsor to push advertising content to the user's mobile device, and/or permitting the collection of information regarding the user's device and/or network activity while enjoying non-subscription access to the wireless network. As used herein, the term "advertiser" and "sponsor" are substantially synonymous, and represent entities providing the advertising content and/or financial support for user's non-subscription access to the network. Finally, when the phrase "access to a network" is used herein, the access may include subscription access, non-subscription access, or a combination thereof.

Figure 1:
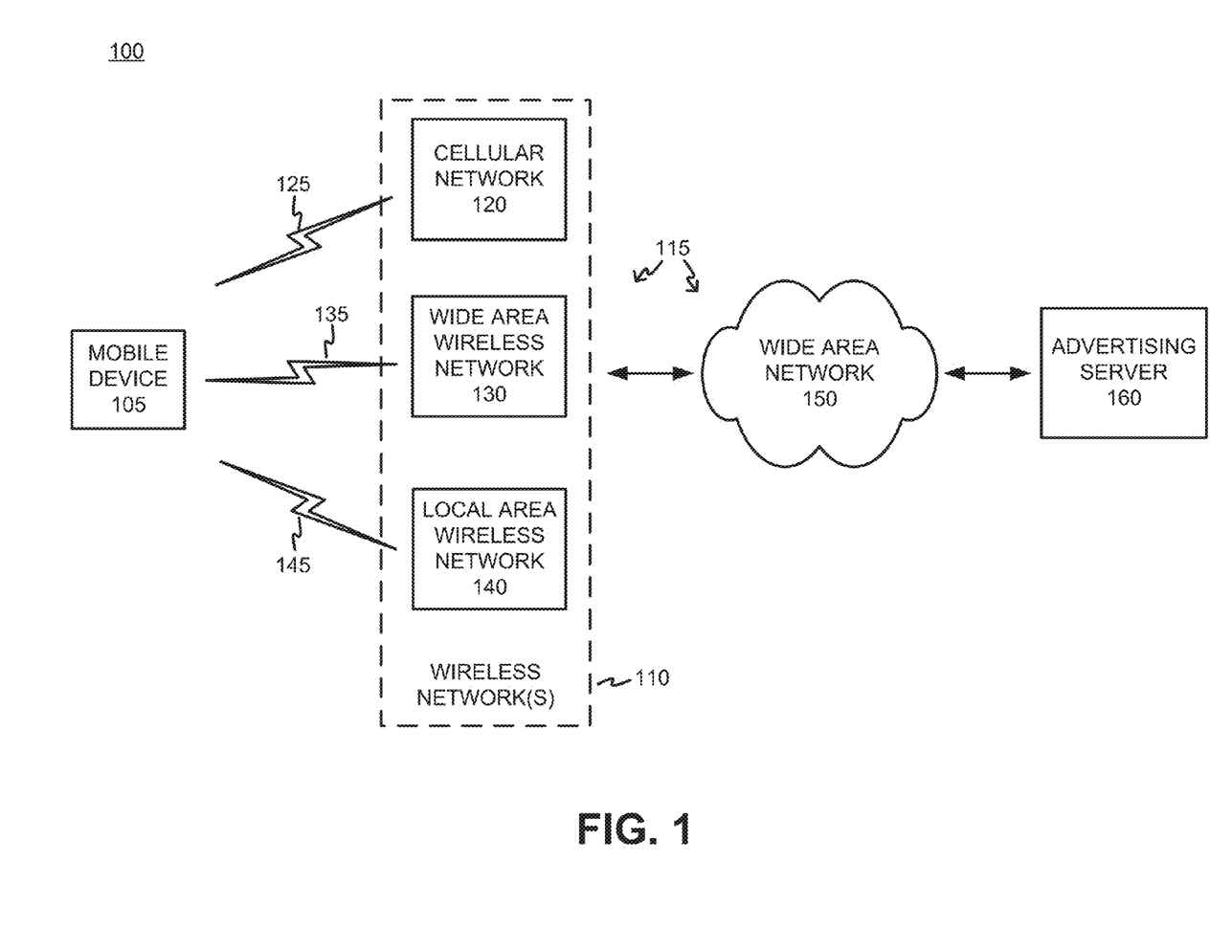
FIG. 1 is a block diagram of an exemplary environment for providing non-subscription access to a network.

FIG. 1 is a block diagram of an exemplary environment 100 which can provide non-subscription access to a network 115. Environment 100 may include one or more mobile device 105, network 115, and an advertising server 160. Network 115 may include one or more wireless network(s) 110 and a wide area network 150. Wireless networks 110 may further include, for example, a cellular network 120, a wide area wireless network 130, and/or a local area wireless network 140. For ease of explanation, only one mobile device 105 and advertising server 160 are illustrated as being connected to network 115. However, it should be understood that a plurality of mobile devices 105, advertising servers 160, and/or other known network entities may be communicatively coupled to network 115.

Mobile device 105 may obtain access to network 115 through wireless network(s) 110 over any type of known radio channel or combinations thereof. For example, mobile device 105 may access any cellular network 120 over wireless channel 125. Access over wireless channel 125 may be provided through a base station, eNodeB, etc. within cellular network 120, as will be described in more detail below in reference to an embodiment shown in FIG. 2. In various embodiments, cellular network 120, wide area wireless network 130, and/or local area wireless network 140 may also communicate with each other in addition to mobile device 105. Mobile device 105 may also access network 115 over wireless channel 135 through wide area wireless network 130. Wide area wireless network 130 may include any type wireless network covering larger areas, and may include a mesh network (e.g., IEEE 801.11s) and/or or a WiMAX IEEE 802.16. Mobile device 105 may access network 115 over wireless channel 145 through local area wireless network 130, which may include WiFi (e.g., any IEEE 801.11x network, where x=a, b, c, g, and/or n). The wireless network(s) 110 may exchange data with wide area network 150 which could include backhaul networks, backbone networks, and/or core networks. Advertising server 160 may interface with wide area network 150, and thus with mobile device 105 over one or more of the air interfaces 125, 135, 145 through wireless network(s) 110.

Mobile device 104 may obtain non-subscription access to network 115 over one or more air interfaces 125, 135, and/or 145, which is supported by advertising content provided by advertising server 160. Connections made via non-subscription access can be referred to herein as "open access," or accessing the "open network." In some embodiments, non-subscription access may require some form of validation to check a user's identity and/or a parameter identifying the mobile device. In a system offering non-subscription access, the sponsor pays for the services that the user receives, in return the user is exposed to advertising content. As used herein, exposure to advertising content may include a user viewing graphics, image, and/or video advertising content, listening to audio advertising content, and/or interacting with various widgets in a user interface provided by the advertiser. Mobile device 105 does not have to be provisioned in the conventional sense for non-subscription access to network 115. As long as mobile device 105 is discoverable, it may gain non-subscription access without conventional provisioning (e.g., locking in an identity with a particular user, mobile carrier, and/or "pay as you go" service provider) or pre-established arrangements with the carrier. For example, mobile device 105 be any type of IP capable device, and may obtain voice and/or other services through Over The Top (OTT) providers (e.g., Skype).

In one embodiment, any mobile device 105 can be used, even a used recycled device. Thus, a user may purchase a new mobile device, or obtain an appropriate used mobile device, simply turn the mobile device on and obtain non-subscription access to network 115. In return, the user will accept advertisements from advertising server 160. For example, a user may purchase a new mobile phone that is IP capable, or use an older available phone that is not authorized to the network in a conventional manner. The user may power the phone on, and use it for non-subscription access to the network 115 to make free calls and/or access data services. Additionally, the user may be required to accept various terms set forth by the advertiser to be granted non-subscription access to network 115. In one embodiment, the user will be asked to accept terms and conditions which allow for data analytics collection.

Mobile device 105 may include any type of electronic device having communication capabilities, and thus communicate over network 115 using a variety of different channels, including both wired and wireless connections. Mobile device 105 may include, for example, a cellular radiotelephone, a smart phone, a tablet, a set-top box (STB), a mobile phone, an type of IP communications device, a Voice over Internet Protocol (VoIP) device, a laptop computer, a palmtop computer, a gaming device, a media player device, or a digital camera that includes communication capabilities (e.g., wireless communication mechanisms).

Wireless network(s) 110 may include one or more wireless networks of any type, such as, for example, a local area network (LAN), a wide area network (WAN), a wireless satellite network, and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

Wide area network 150 may be any type of wide area network connecting back-haul networks and/or core networks, and may include a metropolitan area network (MAN), an intranet, the Internet, a cable-based network (e.g., an optical cable network), networks operating known protocols, including Asynchronous Transfer Mode (ATM), Optical Transport Network (OTN), Synchronous Optical Networking (SONET), Synchronous Digital Hierarchy (SDH), Multiprotocol Label Switching (MPLS), and/or Transmission Control Protocol/Internet Protocol (TCP/IP).

Advertising server 160 may include a server that provides advertising content and manages user access, terms for access, and access parameters for users requesting non-subscription access to network 115. Advertising server 160 may initially provide and further update advertising content a mobile device 105 in a push manner over wide area network 150 and wireless networks 110. Advertising server 160 may manage the advertising content for a single sponsor, or for a plurality of sponsors, and may act as a third party to the wireless carrier. In such cases where advertising server 160 serves multiple sponsors, a trusted third party, separate from the mobile network operator, may manage advertising server 160 and charge the sponsors for such access. In other embodiments, the advertising server may be managed by and reside within the core network of the mobile network operator.

Figure 2:
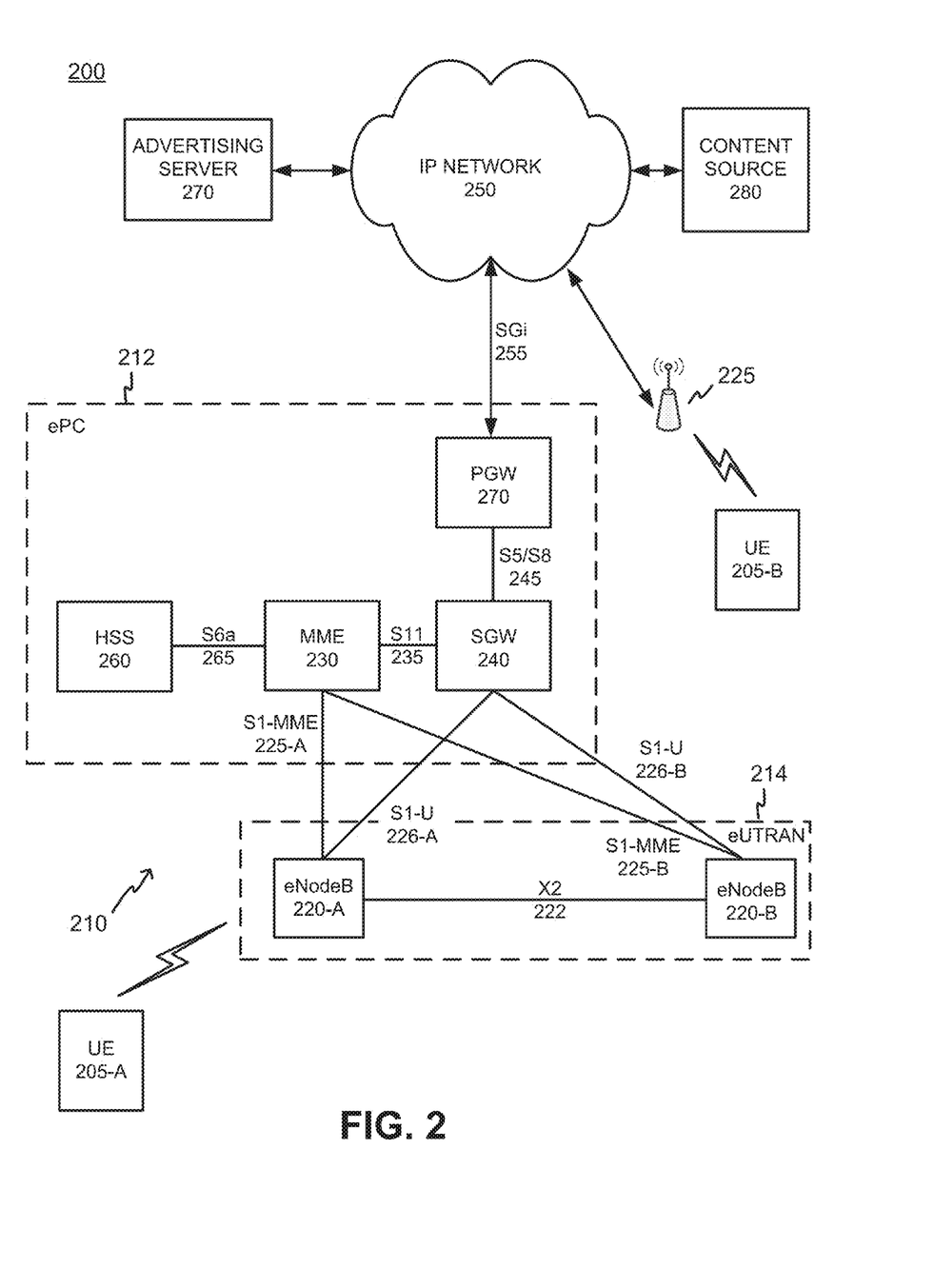
FIG. 2 is a block diagram of an exemplary wireless network which provides both subscription and non-subscription access.

FIG. 2 is a block diagram of an exemplary networking system 200 that provides both subscription and non-subscription access. As shown in FIG. 2, networking system 200 may include mobile device 105 embodied as UEs 205-A and 206-B (as used herein, collectively referred to as "UE 205" and individually as "UE 205-$x$"), a wireless network 210 which includes an evolved Packet Core (ePC) 212 and an evolved UMTS Terrestrial Network (eUTRAN) 214, an Internet Protocol (IP) network 250, a WiFi wireless access point (WAP) 225, an advertising server 270, and a content source 280.

Wireless network 210 may be an LTE network, and include one or more devices that are physical and/or logical entities interconnected via standardized interfaces. Wireless network 210 provides wireless packet-switched services and wireless IP connectivity to user devices to provide, for example, which include data, voice, and/or multimedia services. The ePC 212 may further include a mobility management entity (MME) 230, a serving gateway (SGW) device 240, a packet data network gateway (PGW) 270, and a home subscriber server (HSS) 260. The eUTRAN 214 may further include one or more eNodeBs (herein referred to collectively as "eNodeB 220" and individually as "eNodeB 220-$x$"). It is noted that FIG. 2 depicts a representative networking system 200 with exemplary components and configuration shown for purposes of explanation. Other embodiments may include additional or different network entities in alternative configurations than which are exemplified in FIG. 2.

Further referring to FIG. 2, each eNodeB 220 may include one or more devices and other components having functionality that allow UE 205 to wirelessly connect to eUTRAN 214. eNodeB 220 may interface with ePC via a S1 interface, which may be split into a control plane S1-MME interface 225 and a data plane S1-U interface 226. S1-MME interface 225 may interface with MME device 230. S1-MME interface 225 may be implemented, for example, with a protocol stack that includes a Network Access Server (NAS) protocol and/or Stream Control Transmission Protocol (SCTP). S1-U interface 226 may interface with SGW 240 and may be implemented, for example, using a General Packet Radio Service Tunneling Protocol version 2 (GTPv2). eNodeB 220-A may communicate with eNodeB 220-B via an X2 interface 222. X2 interface 222 may be implemented, for example, with a protocol stack that includes an X2 application protocol and SCTP.

MME device 230 may implement control plane processing for access network 201. For example, MME device 230 may implement tracking and paging procedures for UE 205, may activate and deactivate bearers for UE 205, may authenticate a user of UE 205, and may interface to non-LTE radio access networks. A bearer may represent a logical channel with particular quality of service (QoS) requirements. MME device 230 may also select a particular SGW 240 for a particular UE 205. A particular MME device 230 may interface with other MME devices 230 in ePC 201 and may send and receive information associated with UEs, which may allow one MME device to take over control plane processing of UEs serviced by another MME device, if the other MME device becomes unavailable.

SGW 240 may provide an access point to and from UE 205, may handle forwarding of data packets for UE 205, and may act as a local anchor point during handover procedures between eNodeBs 220. SGW 240 may interface with PGW 270 through an S5/S8 interface 245. S5/S8 interface 245 may be implemented, for example, using GTPv2.

PGW 270 may function as a gateway to IP network 250 through a SGi interface 255. IP network 250 may include, for example, an IP Multimedia Subsystem (IMS) network, which may provide voice and multimedia services to UE 205, based on Session Initiation Protocol (SIP). A particular UE 205, while connected to a single SGW 240, may be connected to multiple PGWs 250, one for each packet network with which UE 140 communicates.

Alternatively UE 205 may exchange data with IP network 250 though WiFi wireless access point WAP 225. The WiFi WAP 225 may be part of a local area network, and access IP network 250 through a wired connection via a router. Alternatively, WiFi WAP 225 may be part of a mesh network (e.g., 801.11s). WiFi WAP 225 may be part of a local area network, or part of a wide area network (WiMaxx) or a mesh network (801.11s).

MME device 230 may communicate with SGW 240 through an S11 interface 235. S11 interface 235 may be implemented, for example, using GTPv2. S11 interface 235 may be used to create and manage a new session for a particular UE 205. S11 interface 235 may be activated when MME device 230 needs to communicate with SGW 240, such as when the particular UE 205 attaches to ePC 212, when bearers need to be added or modified for an existing session for the particular UE 205, when a connection to a new PGW 270 needs to created, or during a handover procedure (e.g., when the particular UE 205 needs to switch to a different SGW 240).

HSS device 260 may store information associated with UEs 205 and/or information associated with users of UEs 205. For example, HSS device 260 may store user profiles that include authentication and access authorization information. MME device 230 may communicate with HSS device 260 through an Sha interface 265. Sha interface 265 may be implemented, for example, using a Diameter protocol.

Advertising server 270 may exchange information using a standard TCP/IP interface with IP network 250, and further communicate with ePC 212 using SGi 255. Communications between advertising server 270 and UE 205 may be performed through ePC 212 and eUTRAN 214 as shown for UE 205-A, or through WiFi WAP 225 as shown for UE 205-B. The communications between advertising server 270 and UE 205 are channel agnostic, and thus may be performed using any known wireless and/or wired channels, or combinations thereof. Accordingly, other methods for communication between advertising server 270 and UE 205 may be used which are not illustrated in FIG. 2.

Content source 280 may be any type of web server, media repository, streaming source, etc. that can provide UE 205 with content which is requested by the user. Content source 280 may provide any form of media, text, audio, image, video, etc. which can be requested by the user through UE 205. Alternatively, content source may be, or provide a connection to, another communications provider (e.g., other wireless carrier, OTT service, etc.), and thus provide UE 205 with voice, text, and/or video communications with other users of networking system 200.

In one embodiment, UE 205 may provide a request for non-subscription access to advertising server 270 over wireless network 210. The request for non-subscription access may be initially received by the eUTRAN 214, and then forwarded through gateways SGW 240 and PGW 270 to advertising server 270. In an alternative embodiment, if the ePC 212 determines that UE 205 is not a subscriber to the Mobile Network Operator associated with wireless network 210 (and thus cannot obtain subscription access) the requesting UE 205 can be automatically forwarded to advertising server 270 to obtain non-subscription access to wireless network 210. This action may be performed instead of having UE 205 access wireless network 210 in a roaming mode. In either embodiment, advertising server 270 may grant non-subscription access to wireless network 210 for UE 205-A, and/or non-subscription access to WiFi WAP 225 for UE 205-B, in exchange for the user agreeing to receive advertising content from advertising server 270.

Accordingly, in an embodiment, internet-based advertising may be tied into the charging function, and amount of user exposure to advertising content (e.g., number of ad counts) and/or the level of interaction from the user with the advertising content (e.g. number of "click-throughs," survey responses, shared ad content with contacts via social networks) can correspond to a given amount of time UE 250 may receive non-subscription access to networking system 200. Additionally, advertising server 270 may also require the user agree to additional terms for non-subscription access to wireless network 210. In some embodiments, the user would agree to having data collected regarding the user's access to networking system 200, including interactions with sponsors, geolocation data, etc. This data may be collected and stored in a database, for subsequent data analytics operations, and may be provided for sale to interested parties.

Once advertising server 270 grants non-subscription access, the user may receive push advertisements and have access to networking system 200. The advertising server may provide access parameters to ePC 212 for controlling the usage of UE 250 during its non-subscription access to the network. In an embodiment, controlling usage for non-subscription access may be performed by using various aspects of Quality of Service (QoS). For example, a QoS byte count may be used to meter the total amount of bytes of data a user consumes based on advertisements viewed. Moreover, QoS may be used to give users with paid subscription access priority, and/or provide precedence to users willing to consume greater amounts of advertising content, or those who engage in a greater degree of participation with interactive advertising content.

While FIG. 2 shows exemplary components of system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
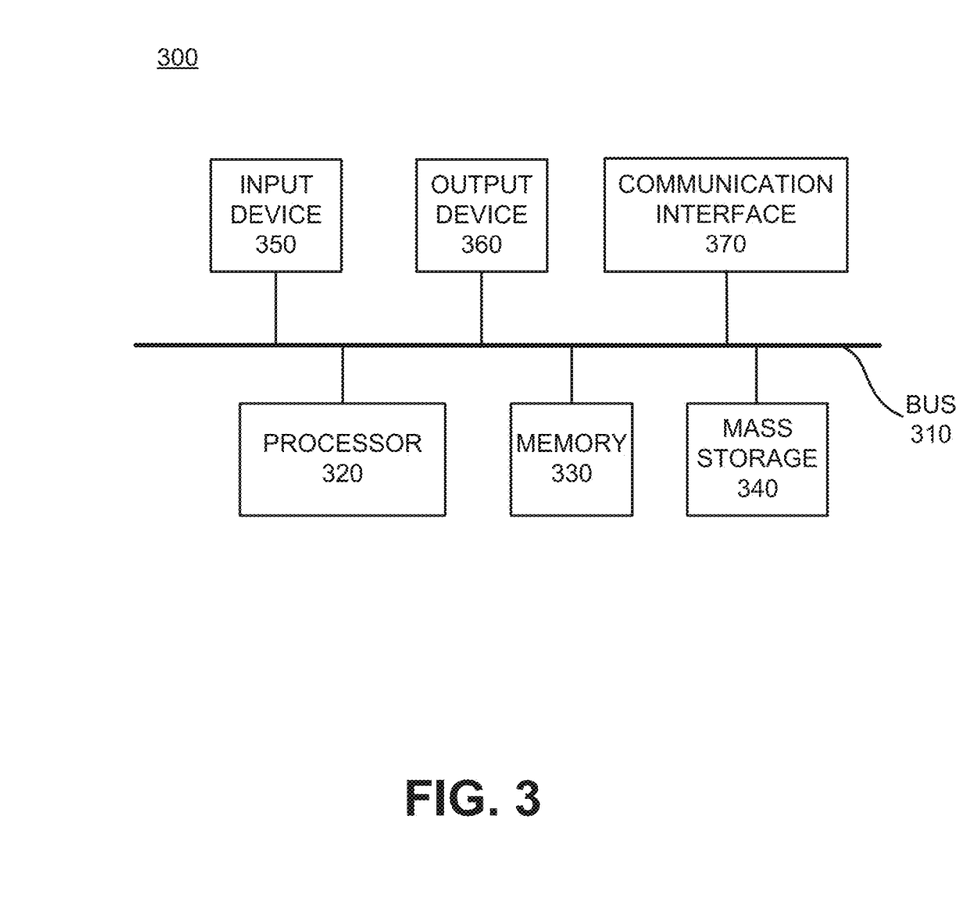
FIG. 3 is a block diagram showing exemplary components of a gateway and/or an advertising server according to an embodiment.

FIG. 3 is a block diagram showing exemplary components of a network element 300 which may be gateway, an advertising server, and/or a content server according to an embodiment. Network element 300 may include a bus 310, a processor 320, a memory 330, mass storage 340, an input device 350, an output device 360, and a communication interface 370.

Bus 310 includes a path that permits communication among the components of network element 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic. For example, the processor 320 may be an x86 based CPU, and may use any operating system, which may include varieties of the Windows, UNIX, and/or Linux. The processor 320 may also use high-level analysis software packages and/or custom software written in any programming and/or scripting languages for interacting with other network entities are communicatively coupled to networking system 200.

Memory 330 may include any type of dynamic storage device that may store information and/or instructions, for execution by processor 320, and/or any type of non-volatile storage device that may store information for use by processor 320. For example, memory 330 may include a RAM or another type of dynamic storage device, a ROM device or another type of static storage device, and/or a removable form of memory, such as a flash memory. Mass storage device 340 may include any type of on-board device suitable for storing large amounts of data, and may include one or more hard drives, solid state drives, and/or various types of RAID arrays. For an advertising server, mass storage device 340 would be suitable for storing files associated sponsor advertising content, databases storing information regarding non-subscription users receiving advertising content, access parameters for non-subscription users, and information which may be used for analytics.

Input device 350, which may be optional, can allow an operator to input information into network element 300, if required. Input device 350 may include, for example, a keyboard, a mouse, a pen, a microphone, a remote control, an audio capture device, an image and/or video capture device, a touch-screen display, and/or another type of input device. In some embodiments, network element 300 may be managed remotely and may not include input device 350. Output device 360 may output information to an operator of network element 300. Output device 360 may include a display (such as an LCD), a printer, a speaker, and/or another type of output device. In some embodiments, network element 300 may be managed remotely and may not include output device 360.

Communication interface 370 may include a transceiver that enables network element 300 to communicate within networking system 200 with other devices and/or systems. The communications interface 370 may be configured for wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 370 may include a transmitter that converts baseband signals to RF signals and/or a receiver that converts RF signals to baseband signals. Communication interface 370 may be coupled to one or more antennas for transmitting and receiving RF signals. Communication interface 370 may include a logical component that includes input and/or output ports, input and/or output systems, and/or other input and output components that facilitate the transmission/reception of data to/from other devices. For example, communication interface 370 may include a network interface card (e.g., Ethernet card) for wired communications and/or a wireless network interface (e.g., a WiFi) card for wireless communications. Communication interface 370 may also include a USB port for communications over a cable, a Bluetooth® wireless interface, an RFID interface, an NFC wireless interface, and/or any other type of interface that converts data from one form to another form.

As described below, network element 300 may perform certain operations relating to gateway operations when embodied as a gateway (e.g., SGW 240 and/or PGW 270), providing advertising and/or collecting analytics when embodied as an advertising server 270, and/or providing content and receiving content requests when embodied as a content source 280. Network element 300 may perform these operations in response to processor 320 executing software instructions contained in a computer-readable medium, such as memory 330 and/or mass storage 340. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of network element 300, in other implementations, network element 300 may include fewer components, different components, additional components, or differently arranged components than depicted in FIG. 3.

Figure 4:
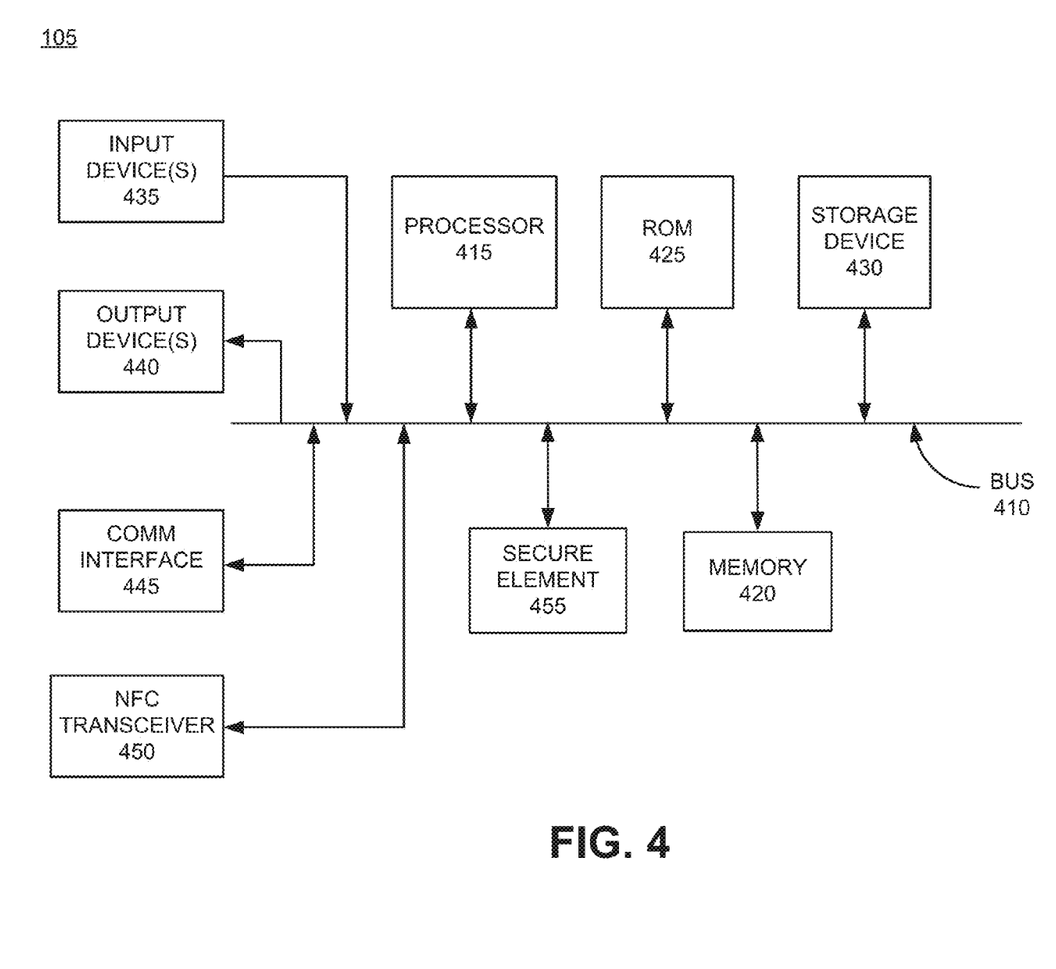
FIG. 4 is a block diagram showing exemplary components of a mobile device according to an embodiment.

FIG. 4 is a block diagram showing exemplary components of a mobile device 105 according to an embodiment. Mobile device 105 may include a bus 410, a processor 415, memory 420, a read only memory (ROM) 425, a storage device 430, one or more input device(s) 435, one or more output device(s) 440, a communication interface 445, a Near Field Communications (NFC) transceiver 450, and Secure Element (SE) 455. Bus 410 may include a path that permits communication among the elements of mobile device 105.

Processor 415 may include a processor, microprocessor, or processing logic that may interpret and execute instructions. Memory 420 may include a random access memory (RAM) or another type of dynamic storage device that may store information and instructions for execution by processor 415. ROM 425 may include a ROM device or another type of static storage device that may store static information and instructions for use by processor 415. Storage device 430 may include a magnetic and/or optical recording medium and its corresponding drive.

Input device(s) 435 may include one or more mechanisms that permit an operator to input information to mobile device 105, such as, for example, a keypad or a keyboard, a microphone, voice recognition, components for a touchscreen, and/or biometric mechanisms, etc. Output device(s) 440 may include one or more mechanisms that output information to the operator, including a display, a speaker, etc. Communication interface 445 may include any transceiver mechanism that enables mobile device 105 to communicate with other devices and/or systems. For example, communication interface 445 may include mechanisms for communicating with another device or system via a network, such as wireless network 210.

Secure Element (SE) 455 may be inserted into a secure element interface (I/F) (e.g., a smart card or Subscriber Identifier Module (SIM) card interface) of mobile device 105. SE 455 may store secure applications and data to permit mobile device 105 to perform trusted exchanges with other network entities. In alternative embodiments, SE 455 may be permanently coupled to mobile device 105, and thus cannot be removed by a user. SE 455 may include, for example, a Universal Integrated Circuit Card (UICC), a removable user identity card (R-UIM), a subscriber identity module (SIM), a universal subscriber identity module (USIM), or an Internet Protocol (IP) multimedia services identity module (ISIM).

In general, SE 445 is a tamper-resistant platform (e.g., a single-chip secure microcontroller) capable of securely hosting applications and their associated confidential and/or cryptographic data (e.g., key management) in accordance with the rules and security requirements set forth by a set of well-identified trusted authorities. SE 445 may be capable of securely storing applications (hereinafter referred to as "secure applications") and cryptographic data (such as, for example, secure keys). The secure information stored in SE 445 may be managed in accordance with rules and security requirements provided by established trusted authorities. Accordingly, SE 445 is the component in mobile device 105 providing the security and confidentiality required to perform validation of a user's identity for subscription and/or non-subscription access to networking system 200, and/or support trusted exchanges among various network entitles over networking system 200.

In an embodiment, an existing SE 445 which was previously used in mobile device 105 for subscription access may also be used to gain non-subscription access to networking system 200. As will be explained in more detail below with respect to FIG. 6, devices which are not validated for subscription access to networking system 200 may be directly sent to advertising server 270 to gain non-subscription access in an automatic fashion. Note that in systems providing conventional access, non-validated mobile devices 105 are typically treated as a roaming device in wireless network 210, where a user may be prompted for credit card to pay for subscription access. Accordingly, non-subscription access may serve as a more desirable substitute for roaming, since the advertiser pays for access. In alternative embodiments, instead of being automatically sent directly to advertising server 270, the non-validated mobile device 105 may send a request to advertising server 270 for non-subscription access. In either embodiment, a validation process may be performed by the ePC 212 and/or the advertising server 270 to ensure that SE 445 is not associated with a stolen mobile device 105.

In yet another embodiment, mobile device 105 may be dedicated to a particular network and/or sponsor for use with non-subscription access. In such a case, SE 455 may be permanently attached and locked (i.e., "hardwired) to mobile device 105, thus preventing mobile device 105 from being unlocked and used on a competitor's network or non-subscription access service. This embodiment may utilize specific SE 455 having identity parameter(s) (e.g., an International Mobile Subscriber Identity (IMSI)) within a specific range, so they could be easily recognized as being associated with a particular sponsor, and thus offered the sponsor's non-subscription access automatically when it attaches to wireless network 210.

In yet another embodiment, a particular SE 455 may be available for separate purchase by a user for replacing an existing SE with in mobile device 105. In this embodiment, the SE 455 may be replaced by the user who desires non-subscription access to networking system 200, thus effectively converting mobile device 105 which was previously relegated only to subscription access to one which may obtain non-subscription access. Such an option can be attractive, as devices which may otherwise have been discarded can be "recycled" for free use on networking system 200.

In yet another embodiment, a user may switch the type of access being used to connect to networking system 200 in order to conserve the limited resources offered through a particular subscription based plan. For example, if the user has subscription access to wireless network 210 through a contracted plan having a limited amount of data and/or minutes, the user may switch to non-subscription access to conserve minutes and/or data offered on the plan. The non-subscription access may be invoked using a particular application offered by a sponsor. For example, if a user desires to update a Facebook page using mobile device 105, an application dedicated to Facebook access may be launched by the user to automatically obtain non-subscription access sponsored by Facebook. In return, mobile device 105 may receive advertising content from Facebook over the duration of the non-subscription access to networking system 200.

Mobile device 105 may perform certain operations or processes, as may be described in detail below. Mobile device 105 may perform these operations in response to processor 415 executing software instructions contained in a computer-readable medium, such as memory 420. A computer-readable medium may be defined as a physical or logical memory device. A logical memory device may include memory space within a single physical memory device or spread across multiple physical memory devices. The software instructions may be read into memory 420 from another computer-readable medium, such as storage device 430, or from another device via communication interface 445. The software instructions contained in memory 420 may cause processor 415 to perform operations or processes that will be described in detail with respect to FIG. 6. Alternatively, hardwired circuitry may be used in place of or in combination with software instructions to implement processes consistent with the principles of the embodiments. Thus, exemplary implementations are not limited to any specific combination of hardware circuitry and software.

The configuration of components of mobile device 105 illustrated in FIG. 4 is for illustrative purposes only. It should be understood that other configurations may be implemented. Therefore, mobile device 105 may include additional, fewer and/or different components than those depicted in FIG. 4.

Figure 5:
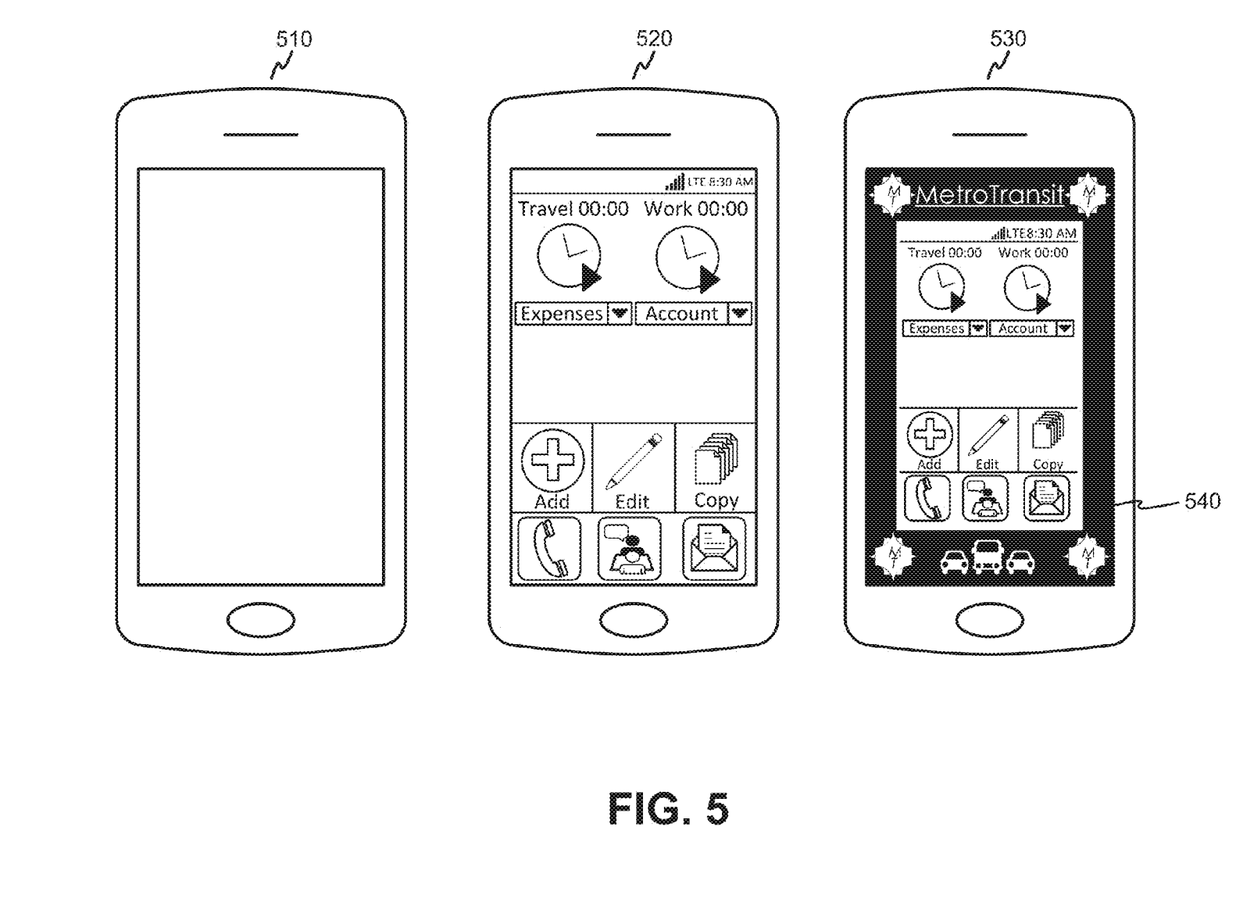
FIG. 5 is a diagram depicting exemplary displays of a mobile device including a display showing advertising content.

FIG. 5 is a diagram depicting different modes of an exemplary display of a mobile device 105. As described above, when the user agrees to receive advertising content in exchange for non-subscription access to networking system 200, advertising server 270 may push advertising content to mobile device 105. The advertising content may be any type of multimedia and or interactive data which can be provided to mobile device 105 for exposure to the user, such as, for example, audio, video, image, animation, and/or user interface elements which respond to the user's input. The user's input may be provided via a touch screen (including virtual keyboard), microphone, camera, motion, light, and/or other sensors found on mobile devices. As shown in FIG. 5, when the mobile device is turned off, no advertising content is provided to the user and the display of mobile device 510 is blank. During conventional subscription access to networking system 210 (or when no network access is available) mobile device 520 may display content normally, whether generated by the device itself executing its programming and/or content which is downloaded from wireless network. In this instance, because the user is paying for access to the network, advertising content is not provided or displayed on mobile device 520.

During non-subscription access to networking system 210, where the sponsors are paying for the user's access to networking system 200, mobile device 530 may expose the user to advertising content pushed by the advertising server 270. In one embodiment, the advertising content may be displayed as a graphics overlay onto the content normally displayed by the mobile device. As used herein, normally displayed content would be any content provided and displayed by the mobile device which does not originate from the advertising server 270.

For example, as shown in FIG. 5, mobile display 530 shows an overlay 540 bordering graphics content which is normally displayed by the mobile device 520, but reduced in size to accommodate overlay 540. A graphics overlay exposing the user to advertising content, which is continuously displayed on mobile device 530, may be referred to herein as a "screen mastic." The screen mastic may also be referred to herein as an "an advertising skin," as it can be continuously displayed along with displays normally provided by mobile device 105. The screen mastics may display content relating to the advertiser's identity, and information about products, services, and promotions. The screen mastic may be dynamic and respond to user input (for example, touch input), and its content may change over time and/or in response to user inputs.

Upon entering non-subscription access to the networking system 200, the user may be presented with a home page which permits selection from a plurality of sponsors. Each sponsor may present a configurable advertising skin which may change dynamically over time, based on location and/or preferences either selected by the user and/or inferred from the user's network activity. In one example, a particular sponsor may indicate special promotions on the screen mastic for a limited period of time. A user may indicate interest in the promotion (e.g., by tapping/touching the screen mastic in the appropriate spot on the touch-sensitive display) and be linked to sponsor's site to take advantage of the promotion. In another embodiment, the advertising content may vary for a particular advertiser, or content may rotate among a selected group of advertisers. Mobile device 105 may provide a user interface element (e.g., a home button) which allows the user to return to a home page, and reselect a different sponsor. A user interface element may also be provided to quickly disable the display of the screen mastic.

The advertising content would not be restricted to video, graphics, and/or imagery. In other embodiments, advertising content may be provided as audio and/or voice content, and may be presented to the user along with graphically displayed content, or as standalone content. For example, voice advertisements may be provided over a voice communications channel, and exposed to the user by being played through the headset or speaker of mobile device 105.

Figure 6:
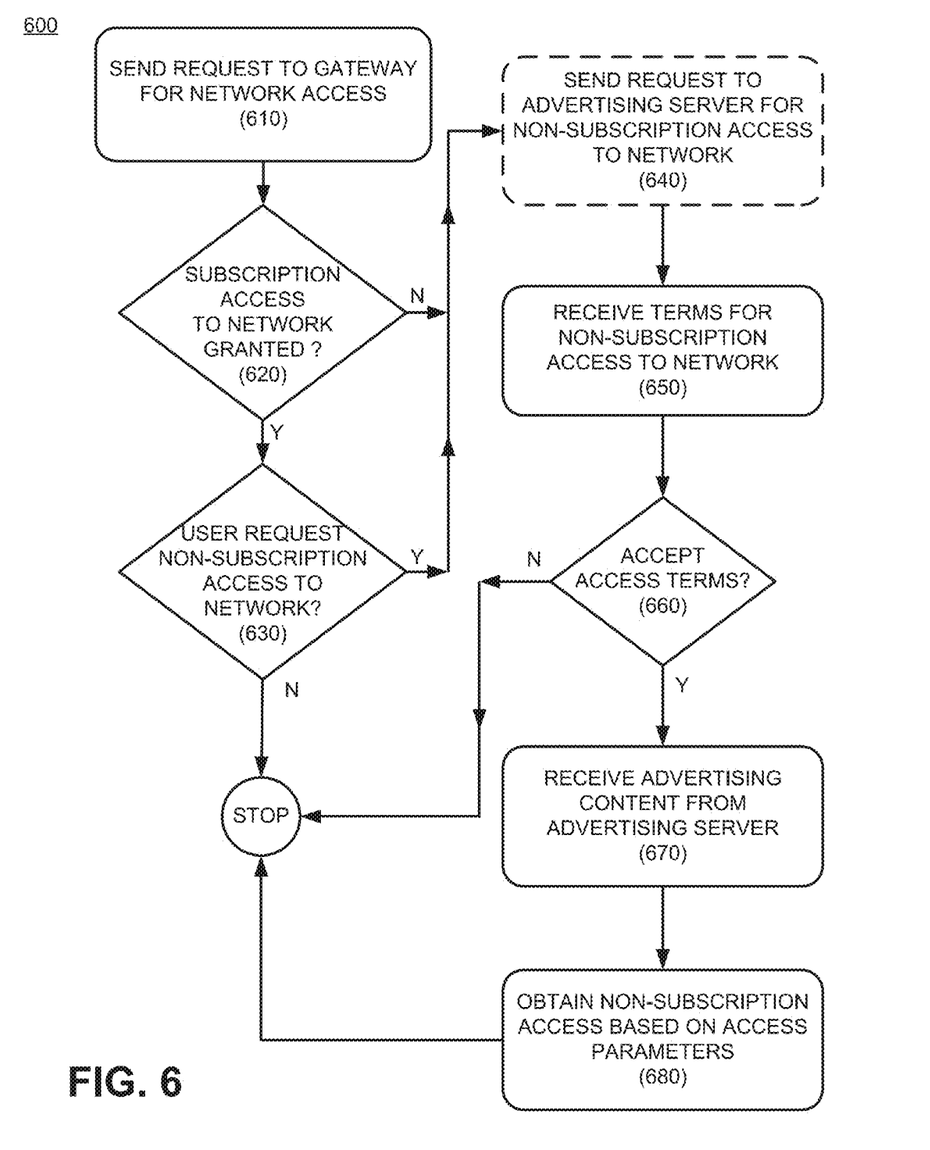
FIG. 6 is a flow chart showing an exemplary process for obtaining non-subscription access to a wireless network.

FIG. 6 is a flow chart showing an exemplary process 600 for obtaining non-subscription access to a network 115 which can execute on mobile device 105. Mobile device 105 initially sends a request to access network 115 (610). The request may be made over any suitable wireless channel, such as, for example, an LTE cellular channel through an eNodeB, a WiFi channel through a wireless access point, etc. In the example of LTE wireless network 210, UE 205-A may send a request to create a user plane session to PGW 270 through eNodeB 220-A and SGW 240. Wireless network 210 may check to see if mobile device UE 205-A has subscription access to the network. MME 230 may check the credentials provided by the SE 445 in mobile device 205-A, to see if the mobile device can be validated for subscription access. MME 230 may use access list information from HSS 260 to validate the credentials provided by mobile device 205-A. MME 230 may then provide the mobile device 205-A with an indication of whether it was validated for subscription access to wireless network 210.

Based on information received from network 115, mobile device 105 determines whether subscription access to network 115 was granted (620). If subscription access was not granted, mobile device may optionally, at the user's command, send a request to advertising server 160 for non-subscription access to network 115 (640; optional block indicated in dotted lines). Alternatively, in a typical mode of operation, optional block 640 will skipped, and mobile device 105 will directly establish a connection with advertising server 160 and receive terms for non-subscription access to network 115 (650). In this instance, mobile device 105 is "hotwired" to advertising server 160. This may be based in part, for example, on a predefined range of identifying parameters in SE 455 (e.g., for SIM cards, the International Mobile Subscriber Identity (IMSI) may be used). The predefined range of identifying parameters may be associated with a particular sponsor and/or a particular advertising server 160. Note that in a conventional process, when subscription access to network 115 is denied, mobile device 105 would be designated as a roaming device. By offering non-subscription access to the user in this instance, excess roaming fees can be avoided. If advertising server 160 grants mobile device 115 non-subscription access, it will provide access terms and/or additional access options to the user of mobile device 115.

Mobile device will receive terms for non-subscription access to network 115 which were sent by advertising server 160 (650). The terms may include permission to collect data analytics regarding the user's network activity, interaction with advertising content, geolocation, information relating to the social media (friends on social networks), etc. The user may also be presented with options for selecting from multiple sponsors, choosing among various Over The Top (OTT) services and their corresponding sponsors. Selection of sponsors associated with network carriers may provide tie-in benefits, such as being placed on a "Preferred System Access List," or a "Hierarchal List of System Access." Alternatively, selections may be based on QoS considerations, where different levels of QoS may be provided based upon the amount of advertising the user is exposed to, and/or the amount of activity the user partakes with interactive advertising content of a particular sponsor. In another embodiment, the selection of sponsors may affect the users access to different areas and/or services of the networking system 200.

When the mobile device determines that the user has accepted the terms and/or selected options provided by advertising server 160, mobile device 105 will receive advertising content from advertising server 160 (670). The mobile device 105 will then obtain non-subscription access to network 115 (680). The non-subscription access may be subject to access parameters set by the advertising server (QoS levels, etc.) which may be enforced by other network elements in network 115. For example, in LTE wireless network 210, the amount of data a mobile device receives may be predicated upon a QoS total byte count limit set by advertising server 270. This may be enforced by PGW 270, which may receive the access parameters for mobile device 205-A based upon the options selected by the user of this mobile device.

Referring back to Block 620 in FIG. 6, if mobile device 105 determines subscription access to network 115 was granted (e.g., for LTE network 210, MME 230 determined UE 205-A is in the access list), the user may further decide that non-subscription access is preferable (for example, to conserve limited minutes and/or data associated with a contract plan). In such an instance, the user may wish to utilize a service where a sponsor can provide non-subscription access. This option may be provided by an application associated with the sponsor, and selected automatically when the user invokes the application on mobile device 105 to interact with the sponsor's service. Thus, mobile device 105 may determine whether the user made a request for non-subscription access to network 115 (630). If so, process 600 may proceed to Block 640 through Block 680, as described above, to obtain non-subscription access to network 115.

Figure 7:
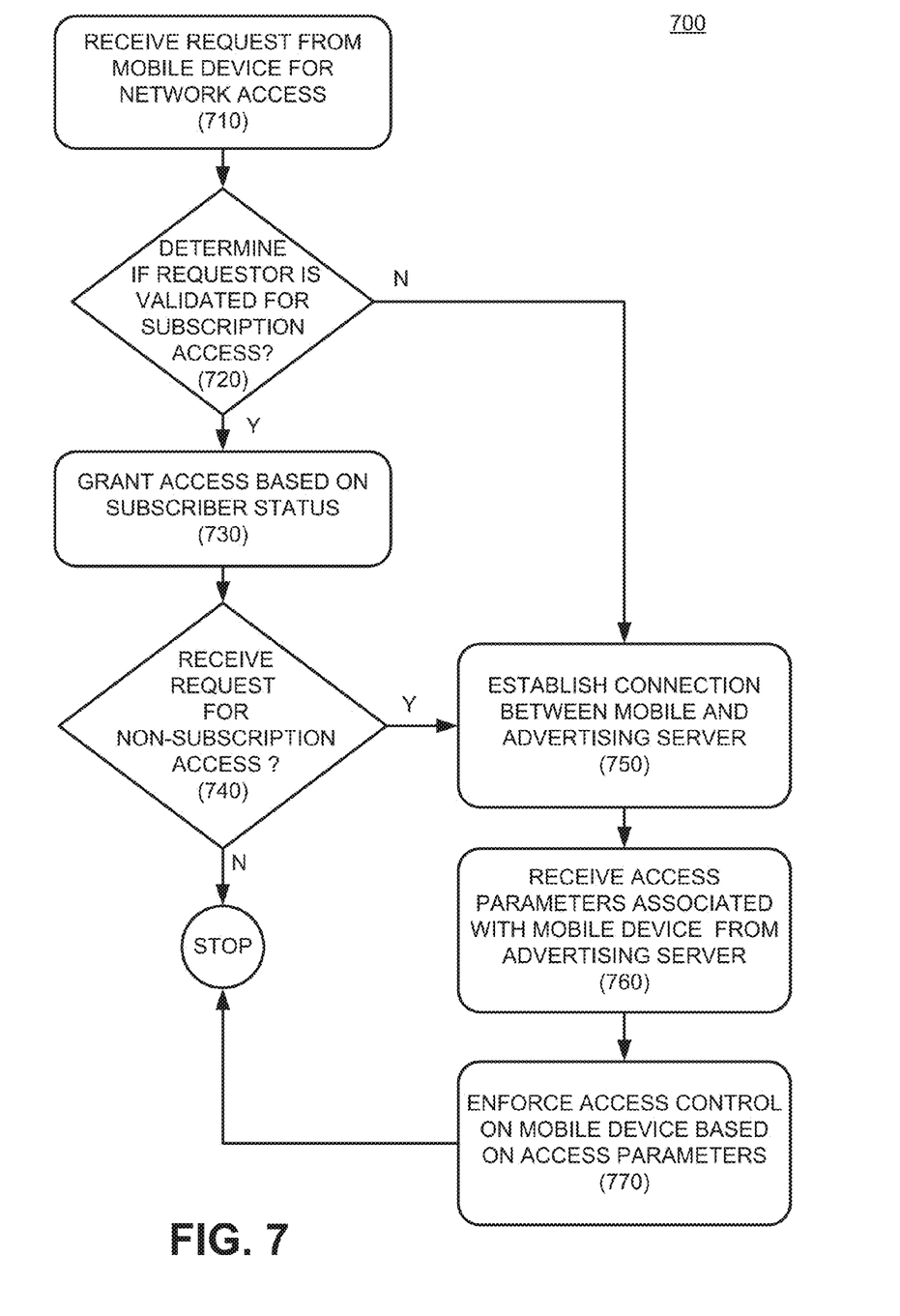
FIG. 7 is a flow chart showing an exemplary process for providing non-subscription access to a wireless network.

FIG. 7 is a flow chart showing an exemplary process 700 for providing a mobile device 105 non-subscription access to wireless network 115. Process 700 may execute on a gateway device in wireless network 110. For example, in LTE network 210, the process may execute on PGW 270 and/or SGW 240. Initially, the gateway receives a request from mobile device 105 for network access (710). The gateway determines whether mobile device 115 is validated for subscription access to network 115 (720). If not, the gateway establishes a connection between mobile device 105 and advertising server 160 (750). Mobile device 105 and advertising server 160 may exchange information regarding non-subscription access terms, and/or various access options selected by the user (as described above in reference to FIG. 6). Based on the terms and selected options, advertising server 160 may determine and provide access parameters to the gateway for governing non-subscription access of mobile device 105. The gateway receives the access parameters associated with mobile device 105 from the advertising server (760). Based upon the received access parameters, the gateway may enforce access control (e.g., QoS levels, total amount of data used, etc.) on mobile device 105.

Referring back to Block 720 in FIG. 7, if the gateway determines mobile device 105 is validated for subscription access to network 115, it will then grant mobile device 105 subscription access (730). The gateway will then determine whether a request for non-subscription access was received from mobile device 105 (740). If a request for non-subscription access was received, the gateway will then execute Block 750-Block 770 to provide non-subscription access to mobile device 105.

Figure 8:
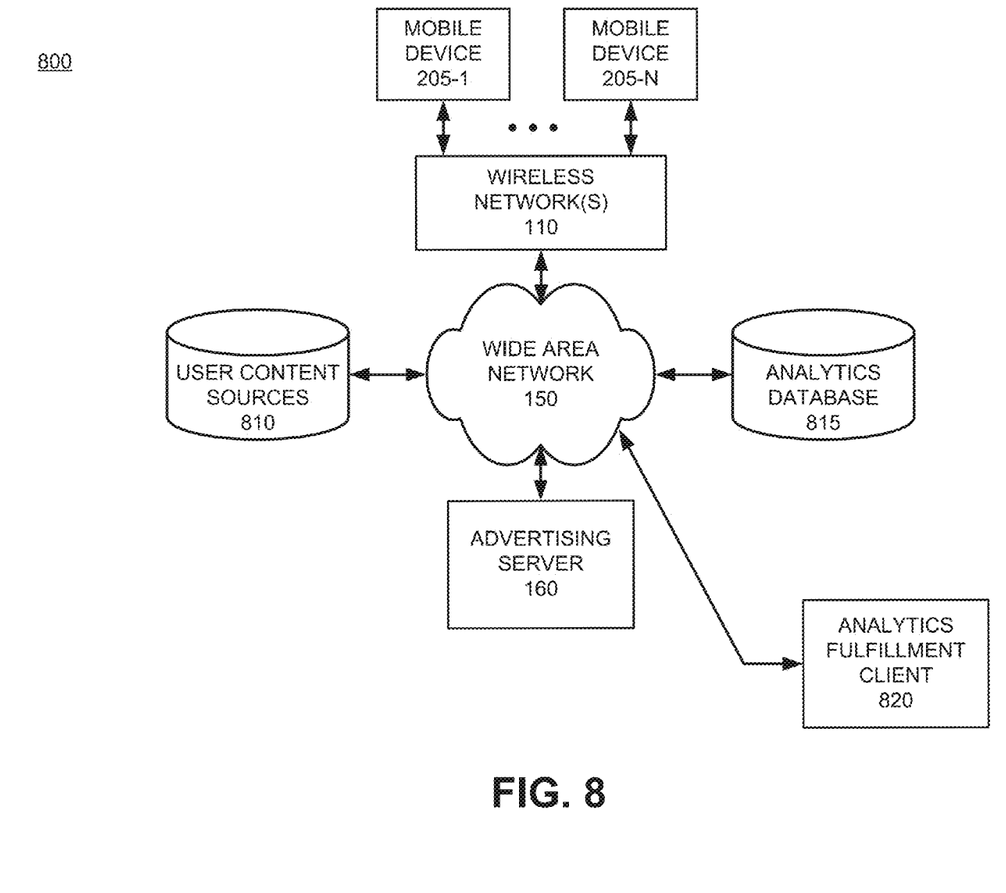
FIG. 8 is a block diagram showing an exemplary environment for an advertising server providing analytic data regarding users non-subscription network access.

FIG. 8 is a block diagram showing an exemplary environment 800 for an advertising server generating and providing analytic data regarding users' non-subscription network access. Environment 800 may include advertising server 160, mobile devices 205 (herein referred to collectively as "mobile devices 205" and individually as "mobile device 205-x"), wireless network(s) 110, wide area network 150, a user content sources database 810, an analytics database 815, and an analytics fulfillment client 820. Wide area network 150 may be in communications with advertising server 160, user content sources database 810, analytics database 815, and analytics fulfillment client 820. As noted above in reference to FIG. 1, wide area network 150 may exchange information with wireless networks 110, and wireless networks 110 are in communications with mobile devices 205.

When the user accepts the terms provided by advertising server 160 as described in reference to FIG. 6, Block 660, the user's acceptance may permit collection of information associated with the users' non-subscription access to network 115. This information may pertain to the users' emails, chats, web site visits, bookmarks, etc, which may be provided by user content database 815. Data collection may further include metrics regarding the users' non-subscription access to network 115, including amount of data consumed, times of access, interactions with sponsors, geolocation data, etc, which may be provided by analytics database 815. The actual collection of the data may, either in whole or in part, be performed by advertising server 160. This data may be collected and stored in a database, for subsequent data analytics operations, and may be provided for sale to interested parties. Analytics fulfillment client 820 may interface to advertising server 160, user content sources database 810, and analytics database 815 over wide area network 150. Analytics fulfillment client 820 may act as an informatics store front providing user information for sale to interested parties.

Figure 9:
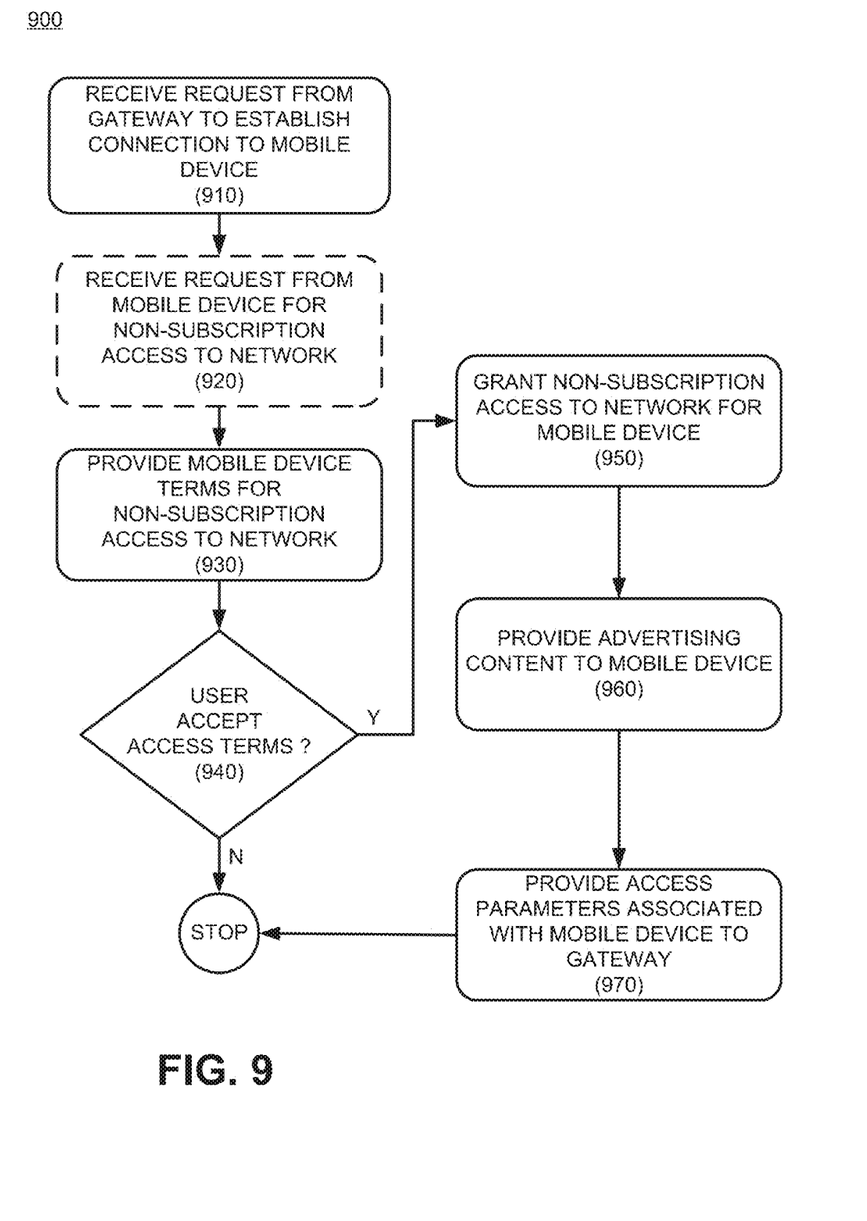
FIG. 9 is a flowchart showing an exemplary process for providing non-subscription access and advertising content for a wireless network.

FIG. 9 is a flowchart showing an exemplary process 900 for providing non-subscription access and advertising content for a wireless network. Process 900 may be performed by advertising server 160. Process 900 may initially receive a request from a gateway (e.g., for LTE network 210, PGW 270 and/or SGW 240) to establish a connection with a mobile device 205 (910). Advertising server 160 may optionally receive a request from mobile device 105 for non-subscription access to network 115 (920, optional block shown in dashed lines). The advertising server provides mobile device terms for non-subscription access to network 115 (930). In addition, the advertising server may further solicit options from the user, via mobile device 115, regarding sponsor selection, type of access, QoS level desired, amount of data, bandwidth, etc. Advertising server 160 then determines whether the user accepted the provided access terms (940), and if so, grants non-subscription access to network 115 to mobile device 105 (950). Advertising server 160 then provides advertising content to mobile device 105. Advertising server may provide the advertising content, along with subsequent updates, in a push manner to mobile device 105. Advertising server will also determine access parameters, based upon the users accepted terms and/or selected access options described above, and provide the access parameters to one or more gateways (not shown) in wireless network 110. The gateway(s) may provide access control for mobile device's 105 non-subscription access to network 115, based on the access parameters received from advertising server 160.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 6, 7 and 9, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method for obtaining non-subscription access to a network, comprising:
    sending, from a mobile device to a packet gateway, a request to access a network wherein the request includes credentials stored within a secure element (SE) of the mobile device for validating subscription access to the network, wherein the SE comprises a tamper resistant platform that securely stores applications and cryptographic data and includes a secure microcontroller;
    receiving, at the mobile device from a mobility management entity, an indication determining whether subscription access to the network was granted based upon the credentials sent in the request;
    providing, in response to subscription access not being granted, an identity parameter from the SE, and wherein non-subscription access is granted based on the identity parameter being within a specific range;
    receiving terms for non-subscription access to the network in response to subscription access not being granted;
    determining if the received terms for non-subscription access were accepted; and
    receiving content and non-subscription access to the network in response to determining that the terms for non-subscription access were accepted and the identity parameter is within the specific range.

2. The method of claim 1, wherein upon determining subscription access was not granted, the method further comprises:
    sending a request for non-subscription access to the network.

3. The method of claim 1, wherein in response to determining that subscription access to the network was granted, the method further comprises:
    determining if non-subscription access to the network is requested by a user, and if so;
    sending a request for non-subscription access to the network,
    receiving the terms for non-subscription access to the network,
    determining if the received terms for non-subscription access were accepted, and
    receiving content and non-subscription access to the network in response to determining the terms for non-subscription access were accepted.

4. The method of claim 3, wherein the content is provided by at least one third party that sponsors non-subscription access to the network, and further comprising:
    selecting from a plurality of Quality of Service (QoS) options for non-subscription access to the network, wherein different QoS options are associated with different presentations of content.

5. The method of claim 4, further comprising:
    selecting from a plurality of third parties based upon the received content.

6. The method of claim 4, further comprising:
    selecting from a plurality of third parties based upon different levels of non-subscription access to the network, wherein the different levels of non-subscription access to the network are based upon different levels of Quality of Service (QoS) or wherein a selection of a third party affects access to different portions of the network.

7. The method of claim 1, wherein the received content comprises at least one of text data, image data, video data, or audio data, and further comprising:
    receiving updates to the content which are pushed by a content server;
    displaying the received content as a screen overlay which is combined with normally displayed device content, wherein:
    the screen overlay is touch sensitive and includes links to additional content provided by at least one third party, or
    the screen overlay changes based on at least one of time, location, or level of service.

8. The method of claim 1, wherein the received content is displayed as a screen mastic which is presented as a border surrounding normally displayed device content.

9. The method of claim 1, further comprising:
    providing data for analytics collection, wherein the provided data includes at least one of sponsor selection, interactions with content, or location.

10. A mobile device, comprising:
    an interface that communicates with a network;
    a secure element (SE) comprising a tamper resistant platform that securely stores applications and cryptographic data, and further comprises a secure microcontroller;
    a memory configured to store instructions; and
    a processor, coupled to the interface, the secure element, and the memory, wherein the processor is configured to execute the instructions stored in the memory to:
    send, to a packet gateway, a request to access a network wherein the request includes credentials stored within the SE for validating subscription access to the network,
    receive, from a mobility management entity, an indication determining whether subscription access to the network was granted based upon the credentials sent in the request, provide, in response to subscription access not being granted, an identity parameter from the SE, and wherein non-subscription access is granted based on the identity parameter being within the specific range, receive terms for non-subscription access to the network in response to subscription access not being granted, determine if the received terms for non-subscription access were accepted, and receive content and non-subscription access to the network in response to determining that the terms for non-subscription access were accepted and the identity parameter is within the specific range.

11. The mobile device of claim 10, wherein the processor is configured to execute the instructions to:

send a request for non-subscription access to the network in response to determining subscription access was not granted.

12. The mobile device of claim 10, wherein in response to determining that subscription access to the network was granted, the processor is configured to execute the instructions to:

determine if non-subscription access to the network is requested, and if so;

send a request for non-subscription access to the network, receive the terms for non-subscription access to the network, determine if the received terms for non-subscription access were accepted, and receive content and non-subscription access to the network in response to determining the terms for non-subscription access were accepted.

13. The mobile device of claim 10, wherein the SE comprises a Universal Integrated Circuit Card (UICC), a removable user identity card (R-UIM), a subscriber identity module (SIM), a universal subscriber identity module (USIM), or an Internet Protocol (IP) multimedia services identity module (ISIM).

14. The mobile device of claim 10, wherein the SE validates an identity associated with the mobile device for both subscription access and non-subscription access to the network, and further wherein the SE was used for subscription access prior to being used for non-subscription access.

15. The mobile device of claim 13, wherein the SE is non-removably coupled to the mobile device, and is used only in association with a predetermined sponsor for non-subscription access to the network.

16. The mobile device of claim 13, wherein the SE is a removably coupled replacement for an SE which was previously installed in the mobile device that permits non-subscription access to the network.

17. The mobile device of claim 10, wherein the memory stores instructions associated with an application which causes the processor to:

switch access from subscription access to non-subscription access to the network based upon user input.

18. A non-transitory computer-readable medium comprising instructions, which, when executed by a processor, cause the processor to:

send, to a packet gateway, a request to access a network wherein the request includes credentials stored within a secure element (SE) for validating subscription access to the network, wherein the SE comprises a tamper resistant platform that securely stores applications and cryptographic data and includes a secure microcontroller;

receive, from a mobility management entity, an indication determining whether subscription access to the network was granted based upon the credentials sent in the request, provide, in response to subscription access not being granted, an identity parameter from the SE, and wherein non-subscription access is granted based on the identity parameter being within a specific range;

receive terms for non-subscription access to the network in response to subscription access not being granted;

determine if the received terms for non-subscription access were accepted; and receive content and non-subscription access to the network in response to determining that the terms for non-subscription access were accepted and the identity parameter is within the specific range.

19. The non-transitory computer-readable medium of claim 18, wherein in response to determining that subscription access was not granted, the instructions further cause the processor to:

send a request for non-subscription access to the network.

20. The non-transitory computer-readable medium of claim 18, wherein in response to determining that subscription access to the network was granted, the instructions further cause the processor to:

determine if non-subscription access to the network is requested by a user, and if so:

send a request for non-subscription access to the network;

receive terms for non-subscription access to the network;

determine if the received terms for non-subscription access were accepted; and receive content and non-subscription access to the network in response to determining the terms for non-subscription access were accepted.

21. The non-transitory computer-readable medium of claim 18, wherein the content is provided by at least one third party that sponsors non-subscription access to the network, and the instructions further cause the processor to:

select from a plurality of Quality of Service (QoS) options for non-subscription access to the network, wherein different QoS options are associated with different presentations of content.

* * * * *